United States Patent [19]

Epstein

[11] Patent Number: 4,835,650
[45] Date of Patent: May 30, 1989

[54] APPARATUS AND METHOD FOR MINIMIZING THE LET-THROUGH VOLTAGE ASSOCIATED WITH CIRCUITS USED IN CONJUNCTION WITH ELECTRONIC ELEMENTS TO SUPPRESS SURGES, TRANSIENTS AND LIKE ELECTRICAL DISTURBANCES

[76] Inventor: Barry M. Epstein, 7523 Cliffbrook, Dallas, Tex. 75240

[21] Appl. No.: 109,625

[22] Filed: Oct. 16, 1987

[51] Int. Cl.$^4$ .............................................. H02H 9/04
[52] U.S. Cl. ...................................... 361/56; 361/91; 361/111; 361/118
[58] Field of Search .................. 261/56, 86, 91, 117, 261/118, 119, 126, 127

[56] References Cited

U.S. PATENT DOCUMENTS

| | | | |
|---|---|---|---|
| 4,586,104 | 4/1986 | Standler | 361/56 X |
| 4,675,772 | 6/1987 | Epstein | 361/56 |
| 4,677,518 | 6/1987 | Hershfield | 361/56 |
| 4,683,516 | 7/1987 | Cook | 361/91 |
| 4,698,721 | 10/1987 | Warren | 361/56 |
| 4,739,436 | 4/1988 | Stefani et al. | 361/91 X |

Primary Examiner—Derek S. Jennings
Attorney, Agent, or Firm—Terry M. Gernstein

[57] ABSTRACT

A surge protection circuit is adapted to have a minimum let-through voltage when a power surge is applied thereto. The circuit includes line conductors connecting a power source to an electrical load being protected and clamping elements connected to those line conductors and across the electrical load. The clamping elements each have terminals at each end thereof and these clamping element terminals are connected directly to the line conductors whereby an essentially impedance-free path is established between the line conductors and the clamping element. When the clamping element is activated, the let-through voltage is essentially equal to the clamping voltage of the clamping element and is not increased by a voltage drop generated by an impedance associated with any leads connecting the clamping element to the line conductors. A method is also disclosed, and the power source and the load can be single or multi-phase.

40 Claims, 6 Drawing Sheets

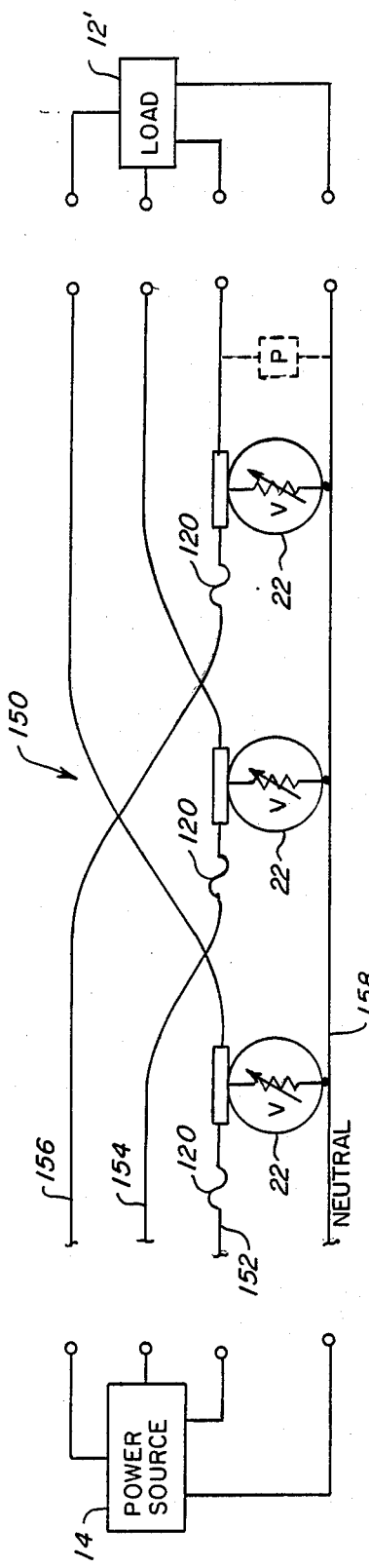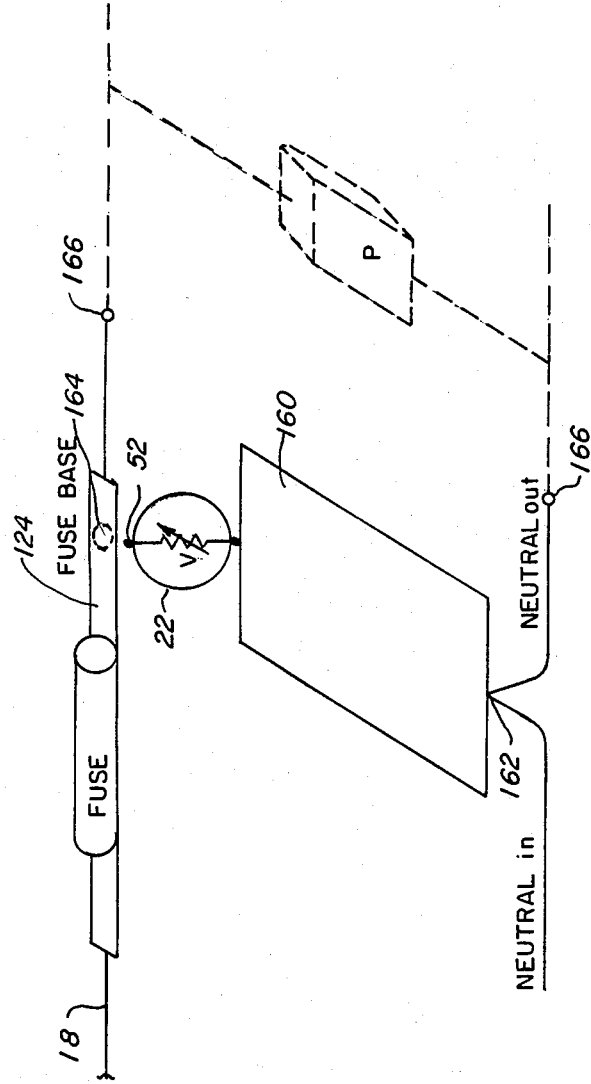
FIG. 9
FIG. 10

APPARATUS AND METHOD FOR MINIMIZING THE LET-THROUGH VOLTAGE ASSOCIATED WITH CIRCUITS USED IN CONJUNCTION WITH ELECTRONIC ELEMENTS TO SUPPRESS SURGES, TRANSIENTS AND LIKE ELECTRICAL DISTURBANCES

BACKGROUND OF THE INVENTION

The present invention relates in general to the protection of electronic equipment from the effects of power line surges, transients and other such electrical disturbances. In particular, the present invention relates to minimizing the let-through voltage associated with any circuits used to protect electronic equipment from the effects of such electrical disturbances.

Communications equipment, computers, automated test and production equipment, military targeting systems, home stereo systems, televisions and other electronic devices as well as electrical loads using integrated circuits, solid state components, semiconductor networks and the like, are increasingly characterized by small electrical contacts and miniature components which are very vulnerable to interference or damage due to interference or damage from electrical disturbances carried by power line conductors connected thereto. Unpredictable variations in power line conductor voltage changes the operating range and can severely damage or destroy such devices. These devices and related process problems are very expensive to repair or to replace and therefore, require cost-effective protection from transients and surges associated with the power.

For convenience of discussion, electrical disturbances may be classified as one of several different types: electrical noise, voltage sags or surges and transients.

Electrical noise, also known as "hash" results from random changes in voltage level. Voltage changes due to noise are not typically very large but they are fairly frequent, such that if a normal operational voltage level were plotted on a graph as a function of time, the voltage level would be represented by a "fuzzy" line instead of a sharp line. Noise in an electrical circuit may be caused by electromagnetic interference from nearby fluorescent lights, transformers, computers, car ignitions, radio and television transmissions, electrical storms or other such sources of electromagnetic or radio-frequency signals.

Voltage surges are a decrease or an increase, respectively, of an AC voltage level for one or more voltage cycles. Sags or surges may originate from many sources, such as loose connections in a device, switches, power overloads, lightning, accidents blackout and brownout corrections, short circuits, grounding or operation of nearby electric motors and generators.

Transients are high-voltage pulses having an extremely fast rise time, typically on the order of a few microseconds, although some transients may last for a period of up to milliseconds or larger. Typically, they may reach a peak voltage of as high as ten thousand volts.

Furthermore, extremely high voltages, mostly due to transients, may additionally cause insulation breakdown, "hot spot" melting of semiconductors, and the destruction of many delicate circuit components which in turn may necessitate costly production losses, service calls and repair time. Additionally, each of these types of electrical disturbances may cause data errors, unscheduled downtime, circuit board failure, transistor failure, disruptive false commands, or the loss of computer memory.

On the other hand, low energy transients may have very fast rise times and peak voltages of ten-thousand volts or higher. Even though the energy is low, the high voltages can damage common household equipment using low-level transistors, such as calculators, radios and the like, and industrial equipment such as computers, instruments, and controls. Higher energy transients may involve energy as high as one-hundred joules and surge currents of as high as ten thousand amperes. Inductive loads, such as motors and transformers, can experience buildup of high instantaneous voltages across their windings from such transients. Resultant arcing across the turns damages the insulation, resulting in shorting out of the turns. Such effects are often progressive, resulting in the ultimate failure of the motor or transformer, or electrical device.

A major manufacturer of appliance motors has analyzed many failures and has determined that over seventy-five per cent were directly or indirectly caused by transients or over-voltage surges. Motors, as well as some of the other above-named equipment, can be designed to withstand surges; however, the extra cost is too great for the consumer appliance market, as well as for many industrial situations.

As discussed above, one source of harmful electrical energy is lightning. Lightning is a very complex electromagnetic energy source having potentials estimated at from five million to twenty million volts and currents reaching thousands of amperes. A lightning stroke generally contains a series of pulses each having a duration of from a nanosecond to several milliseconds. A typical "8/20" lightning pulse lasts for a period of forty microseconds and has a peak current of three thousand to twenty-thousand amperes which is reached in about eight microseconds.

Another source of unwanted electromagnetic energy is a nuclear electromagnetic pulse (EMP or HEMP). An electromagnetic pulse generated by a nuclear detonation produces intense transient electric and magnetic fields with very short rise times and a frequency spectrum extending from approximately zero to more than one hundred megahertz. The electromagnetic pulse from a high altitude explosion typically has a maximum field strength near the ground on the order of fifty kilovolts per meter, a time duration of one microsecond and a rise time of nanoseconds.

Other sources of impulse noise are ground loop interference caused by varying ground potentials.

The above-mentioned noise transient can be coupled to a sensitive electronic device by external or internal coupling. In external coupling, an electromagnetic wave or a lightning pulse impinges on a receiver, such as a power transmission line or system, and the transient voltage induced in the receiver is passed through transformers, rectifiers and other voltage and current altering devices to the electronic devices. The passage of the transient through such devices as transformers alters the original waveform increasing the current levels, the voltage levels and the frequency spectrum. The characteristics of the transient reaching the equipment can be hard to predict because of intermediate coupling devices, thereby making the transient hard to remove.

In general, protection of a system against transient overvoltages by surge protectors requires that these protectors be able to quickly reduce the transient overvoltage to a safe level well below the breakdown voltage of the device being protected without causing a system outage. The primary function of the protecting device is to maintain voltage applied to the protected equipment below that level of voltage which can safely be accepted by such protected equipment. These devices operate on the principle that there effectively is an open circuit through the device until the voltage across the protecting device reaches a critical level, and upon reaching the critical voltage associated with the protecting device, the resistance of the protecting device breaks down to a very low value and the heretofore open circuit breaks down to be a shunt path across the power lines, or to ground. The break down should occur quickly enough to provide protection for advanced electronic devices. There is a voltage and operating speed associated with the device itself, with this voltage sometimes being referred to as the clamping voltage, and thus, these protecting devices are known as clamping elements.

Today, there are many devices that have performance characteristics that adapt them for use as suppression elements. Examples of such devices include special power supply circuits, voltage regulators, motor-generators, constant voltage transformers, gas tubes, capacitors, silicon avalanche suppressors (SAS) and metal oxide varistors (MOV).

While effective, each of these protecting devices has its own drawbacks and is not capable of protecting a device against all of the above-mentioned electrical disturbances.

The fact that no single device can adequately function as a suppressor for all transients that may be encountered has led to the development of what are known in the art as hybrid circuits which attempt to incorporate the beneficial features of a plurality of separate protective devices into one circuit.

While theoretically quite effective, the real-world performance of such suppression devices, whether alone or in a hybrid circuit, vis a vis the theoretical performance thereof often differs. It is the real-world performance of a suppressor that is important to the designer and the user of such an element.

The true test of the real world performance of a suppression device is how low and how quickly the voltage across the device being protected is held during a transient surge. This voltage is the voltage to which the protected device will be exposed. For the purposes of this disclosure, this voltage will be referred to as the let-through voltage. It is the let-through voltage and speed that are the true measures of the effectiveness of any device or combination of devices used to protect electronic equipment. The lower the let-through voltage and the faster the response time, the better and more effective the protecting device is in the real world.

In practice, when the suppression device breaks down to the clamping mode of operation, there is a voltage across the device and the lines protected that can be as high as several hundred volts. This is the voltage "let-through" of the suppressor.

One reason for this relatively high let-through voltage is because the theoretical performance of the suppression device is compromised in the real world by the leads used to connect the device to the line conductors associated with the device or to connect the various component parts of the suppressor device together among themselves. For example, the suppression voltage of a given device may be two hundred volts at a certain current. However, the lead resistance and inductance to couple from the active element into the circuit of interest may add another two hundred volts of series voltage as well as increase the time required for the device to activate. This reduces the overall effectiveness of the device from two hundred volts to four hundred volts of let-through voltage and may let through a damaging high speed leading edge of the pulse disturbance.

In the past, the leads used with such suppression devices are very often of very small diameter which adds to the series resistance and inductance. In fact, many MOV's and other surge suppressors are manufactured with leads such as #22 wire. The problems become even more severe at high levels of AC load current because the impedance of the source becomes even lower. For example, a one hundred amp commercial AC power source may use a conductor with a cross-sectional diameter of approximately ½ inch. The #20 wire used on an MOV will have a diameter of approximately 1/64 of an inch. Even if larger leads are attached to the MOV, they would typically be less than ⅛ inch in diameter to facilitate easy wiring. In all of these cases, the performance of the suppression device with regard to the let-through voltage and speed is severely compromised by the lead impedance of the suppressor being large as compared to the impedance of the main power leads.

FIG. 1 illustrates the problem associated with the prior art. Shown in FIG. 1 is a circuit 10 adapted to protect an electrical device, indicated by load 12, from the effects of electrical disturbances, such as the above-discussed surges, transients, and the like. For the purposes of this disclosure, all of these electrical disturbances will be referred to as "surges", but it is understood that such is a term of convenience and not a term of limitation. Thus, load 12 receives power from a source 14 via line conductors 18. Both the load 12 and the power source can be single or multi phase as necessary, with the single-phase configuration being shown in FIG. 1. The line conductors 18 have an impedance associated therewith, and this impedance is indicated in FIG. 1 by blocks 20. As those skilled in the art understand, the impedance associated with a line conductor, such as line conductors 18, is distributed throughout the length of those line conductors, and therefore the blocks 20 are merely representations of such impedance. For the sake of simplicity, in the following discussion, the term "resistance" may be used in place of the more correct term "impedance" which accounts for frequency and energy storage dependent characteristics. However, it is to be clearly understood that whenever the term "resistance" is used in the following disclosure, claims and figures, this term is intended to imply and include the term "impedance" as well and to thus include all definitions, principles, characteristics, and the like associated with the term "impedance" by those skilled in the art. Of course, those skilled in the art will also understand that the term "resistance" as used herein will also include the principles etc. associated with the term "dynamic resistance" where appropriate. Also, for the sake of convenience, each block 20 is considered as having one-half of the total line impedance associated with the line. In the instant case, this is one-half Z1. The power source 14 establishes a voltage across the line conductors 18 to power the load 12.

As above discussed, certain conditions create an electrical disturbance across line conductors 18. This electrical disturbance is indicated in FIG. 1 as surge voltage V1. As was also discussed above, some sort of surge protection means is included in the circuit. This surge protection means is indicated in FIG. 1 as clamping element 22. This clamping element 22 is shown in FIG. 1 as being an MOV, but can be any other of the known clamping elements, or a combination thereof (hybrid). The clamping element 22 has a steady state configuration of an open circuit; however, upon the occurrence of a surge voltage V1, the clamping element 22 breaks down to a voltage Vs which is less than the surge voltage V1. The breakdown voltage can (theoretically) be zero (a short circuit) or can be any finite value suitable for the particular load, source and line conductors associated therewith.

As indicated in FIG. 1, and as discussed above, the prior art connects the clamping element 22 to the line conductors by means of leads 26. In fact, some manufacturers of prior art devices deliberately add leads to the protection device for connecting that device to the line conductors. These additional leads may be used by the manufacturer for purposes such as a means for protecting against overheating, as a means to extend the life of a device which uses less expensive components, or the like. As discussed above, these leads have a resistance and inductance associated with them. This impedance is indicated in FIG. 1 by the blocks 28, and as also discussed above, this impedance 28 can be quite high. For convenience, the impedances associated with the leads 26 are indicated in FIG. 1 by $\frac{1}{2}$ Z1 and $\frac{1}{2}$ Z2, respectively. It is observed that the inductive component can be treated in a similar manner, yielding considerably higher impedance at high frequencies, such as occurs at the leading edges of surges. This further degrades performance at high frequencies, and degrades total "speed" of protection provided by the suppressor element.

The voltage applied to load 12 as a result of the surge voltage V1 is indicated in FIG. 1 as V2. Voltage V2 is the let-through voltage associated with the surge voltage V1 and the particular clamping element 22 in the circuit 10. For simplicity, load impedance is not considered, and the term "R" is used in the following relationships. This let-through voltage is approximated by the relationship: $V2 \cong Vs + V1[R2/(R1+R2)]$. Since Vs represents the design clamping voltage of the clamping element, and V2 represents the let-through voltage, the term $[R2/(R1+R2)]$ could be visualized as being a figure of merit to determine how closely the real-world performance of a particular device approaches the design, or ideal, performance of a clamping element. That is, upon the occurrence of a surge, the figure of merit can be used to determine how close the voltage actually applied (i.e., the let through voltage) to a load protected by a particular device approaches the clamping voltage of that particular device. The lower the value of R2, the closer the let-through voltage V2 approaches the clamping voltage Vs. Even if the clamping element were to short (thus making Vs zero), with the prior art circuit 10, the let-through voltage V2 will still have a finite value above that of the design clamping voltage due to the presence of R2 associated with the leads 26, and this let-through voltage can be quite high if the surge voltage V1 is high. Thus, in the prior art surge protection circuits, the load 12 is still subject to high surge voltages and high frequency components even in spite of the presence of the clamping element 22. This is especially true if the leads 26 are long and small in diameter and hence have a high resistance under surge conditions.

However, even if a designer accepts the fact that there will be a let-through voltage greater than the design clamping voltage associated with the suppression device, his problems are not over. The small leads associated with presently available suppression devices create uncertainty in the level of let-through voltage. For example, the resistivity and ampacity of such leads may change with temperature, skin effects may create variations in impedance depending on the level of current, frequency components of the surge, propagation delays, and the like.

Still further, the leads may be subject to breaking at high temperatures and may thus impose a maximum power rating on the overall device that is lower than the rating of the device itself. This problem is important in lightning or Nuclear Pulse related surges which can be extremely high and can be accompanied by heating of associated components. Obviously, a broken lead to a suppression device may be disastrous since it opens the circuit which should be shunting thereby placing the full potential across the protected device.

The leads may also create a delay time in the operation of the suppression device. Advanced integrated circuitry may be subject to damage if a delay of as short as a fraction of a microsecond is present between the initiation of a transient and activation of the surge suppression device.

Therefore, the leads associated with presently available suppression devices create many problems, both to the designer and to the user of such devices.

Accordingly, any construction techniques which may minimize suppressor lead length are of value. Printed circuit board construction may often be used in a surge suppressor. However, virtually any length of conductor path generates an R2 value much greater than the R1 AC power source. Most printed circuit board applications will also use a suppressor device with the smaller diameter wire size. Also, printed circuit boards tend to be a weak point in high power situations. Other construction techniques may tend to use fixture wiring to connect the suppressor device to the AC power source. However, easy-to-handle wire sizes such as #14 to #12 still represent an appreciable R2 in the practical case since their lengths may range from a few inches to many feet.

Thus, there is need in the art for a surge protection means that protects against any or all electrical disturbances and which quickly reduces the let-through voltage to at or very near the theoretical value of clamping voltage associated with the clamping element itself so that the real world performance of such means approaches very nearly that of the theoretical clamping voltage of the clamping element itself, and at the highest speed and frequency components possible.

OBJECTS

It is a main object of the present invention to protect electronic equipment from the effects of electrical disturbances such as surges, transients and the like while minimizing the let-through voltage and frequency components associated with the protecting function.

It is another object of the present invention to permit the current in the line conductors to pass through the terminal points associated with a protecting device.

It is another object of the present invention to protect electronic equipment against the effects of surges, transients, and like electrical disturbances while minimizing the let-through voltage associated with the protecting device and also permitting the protecting device to be easily connected to the remainder of the system.

It is another object of the invention to provide a surge suppression circuit that is amenable to use with a multiphase power source while still having a minimum let-through voltage.

It is another object of the present invention to provide a means for protecting electronic equipment from the effects of electrical disturbances with a minimum voltage let-through while being amenable to adaptation to provide a wide range of protection.

It is another object of the present invention to provide a means for protecting a load from surges which means is amenable to use in a hybrid device while still providing a minimum voltage let-through.

It is another object of the present invention to provide an means for protecting a load against surges that has the terminals thereof adapted to be physically part of the line conductors associated with the electrical load being protected.

It is another object of the present invention to provide a means for protecting an electrical load from the effects of electrical disturbances such as surges, transients and the like by establishing a predetermined low voltage range which is essentially equal to the theoretical clamping voltage of a clamping device across the load being protected when the voltage across the protecting device equals or exceeds a critical value.

SUMMARY OF THE INVENTION

These, and other objects, are accomplished by the present invention by adapting a clamping element, filter, capacitor or other desired means which is used to protect an electrical load against the effects of electrical disturbances such as surges, transients and the like to have the terminals thereof connected directly to the line conductors associated with that load whereby an essentially impedance-free path is defined between that clamping means and the line conductors. The main flow of current in the line conductors thus passes directly to the clamping element and can be visualized as "passing through" the clamping means terminals. The term "clamping means" is used to make it clear that the present disclosure is intended to include single element units as well as multi-element units, modules, etc, as well as the various forms of the individual clamping and filtering elements as above mentioned.

In this manner, R2 in the relationship associated with the prior art shown in FIG. 1 is significantly reduced or essentially eliminated as the leads associated with such R2 are eliminated. Thus, the voltage V2 across the load is essentially equal to the voltage Vs associated with the clamping means itself, and the above- discussed problems associated with leads between a clamping means and the line conductors are avoided.

This technique is applicable to both single and multi phase systems, and can be expanded to a junction point of the in and the out pair of line conductors in such systems so that more than one clamping element or clamping element modules can be connected at the same physical location. An element or module having the terminals thereof so connected to the line conductors will be a pass-through device since the current in the line conductors will pass through such terminal as it flows in the line conductors. There are essentially no leads in the clamping element or clamping means itself so the drawbacks associated with such leads are not present at all in the clamping element or clamping means itself or in the connection of that clamping element or clamping means to the line conductors.

DESCRIPTION OF THE FIGURES

FIGS. 3-15 are schematics illustrating further embodiments of the present invention.

DETAILED DESCRIPTION

Figure 2:
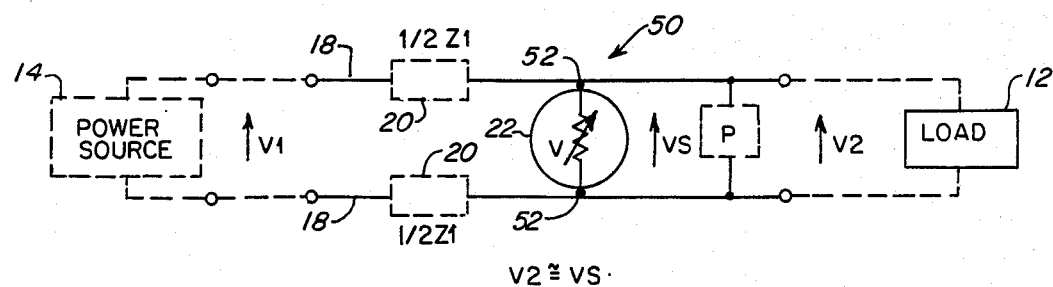
FIG. 2 is a schematic illustrating one embodiment of the surge protection circuit embodying the present invention.

Shown in FIG. 2 is a circuit 50 which protects an electrical device from the effects of an electrical disturbance. As mentioned above, for the sake of convenience, the electrical disturbances will be referred to as a surge. The circuit 50 is similar to the circuit 10, but the leads 26 with their associated resistances and inductances 28 have been eliminated. This reduces R2 in the above-discussed relationship to essentially zero whereby the let-through voltage V2 is equal to the clamping voltage Vs associated with the clamping element 22. Again, the clamping element 22 is indicated in FIG. 2 as an MOV, but could be any type of clamping or parallel filter element. Thus, as shown in FIG. 2, the clamping element 22 has a terminal 52 at each end thereof, and these terminals 52 are connected directly to the line conductors 18. Elimination of the leads 26 thus provides an essentially impedance-free path between the line conductors 18 and the clamping element 22.

As mentioned above, the clamping voltage Vs can be a finite value or can be zero as suitable for the proper protection of the load 12 in circuit 50. Additional secondary clamping devices, such as clamping device P shown in FIG. 2, can be used in conjunction with the primary clamping element 22 in circuit 50. These additional protection devices P can be connected to the line conductors 18 either directly as shown in FIG. 2 or via leads, as suitable. If leads are used, the let-through voltage V2 can still be controlled by the clamping voltage Vs so such leads will not reduce the effect of the direct connection of the clamping element terminals 52 to the line conductors 18.

Figure 3:
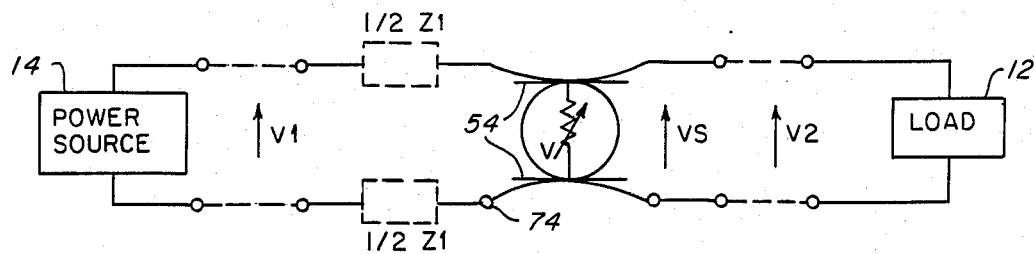
Figure 4:
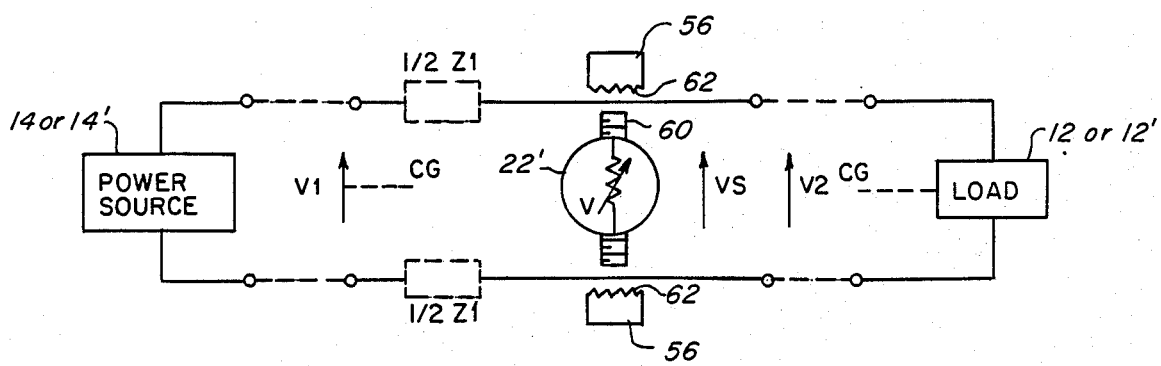

The direct connection of the clamping element terminals 52 to the line conductors 18 can be effected in a variety of ways. Three of these ways are indicated in FIGS. 2, 3 and 4 respectively. In FIG. 2, the line conductors are stripped and the terminals 52 are soldered thereto; in FIG. 3, an electrically conductive plate 54 is affixed to each clamping element terminal 52, and the line conductors are soldered to the plates. The line conductors can be stripped as necessary to effect such soldering operation. In FIG. 4, electrically conductive attaching screws 56 are internally threaded to cooperate with threaded terminals 60 located on each end of a clamping element 22'. Upon cooperatively coupling the attaching screws 56 to the threaded terminals 60, teeth 62 on the attaching screws 56 bite through the insulation of the line conductors 18 to establish electrical contact between the clamping terminals and the line conductors via the attaching screws 56. It is observed that any of these just-disclosed attaching means can be used in conjunction with any of the various embodiments of the clamping element. For example, the attaching screws 56 can be used in conjunction with either the single-phase or the multi-phase configuration as is shown in FIG. 4 by dotted line CG indicating the neutral and/or the ground line conductor.

Figure 5:
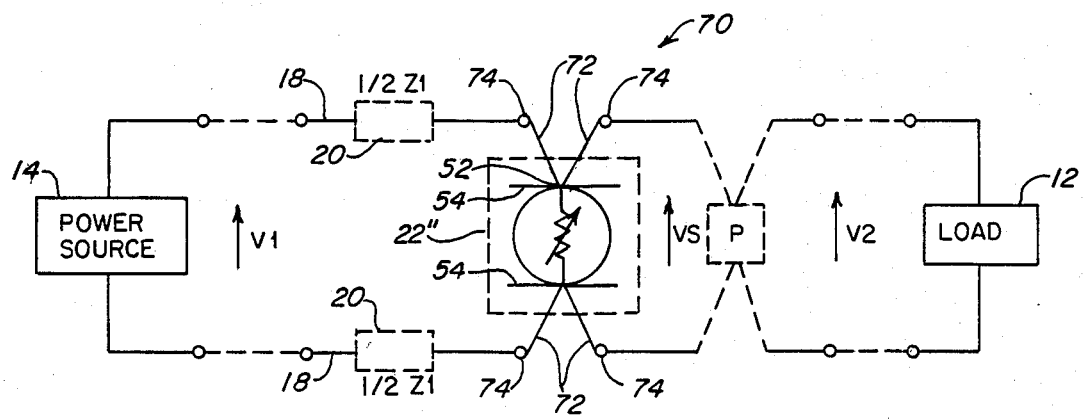

In the event a no lead-configuration is not convenient, the surge protection circuit can be modified as shown in FIG. 5. In such a situation, the circuit should, of course, not be modified so as to add an Z2 to the circuit and thus should be modified to look as if the clamping element terminals 52 are connected directly to the line conductors 18. This is done in the circuit 70 by attaching two leads 72 to each clamping element terminal 52 and electrically connecting such leads 72 to the line conductors 18. The leads 72 are physically the same as the line conductors, that is, these leads 72 have the same (or greater) ampacity as the line conductors 18. In this manner, the leads 72 can be considered as being physically part of the line conductors 18 and thus the value of R1 still accounts for the existence of leads 72. The clamping element is placed in a module and the leads 72 are connected to the clamping element terminals in the module. Such a module is shown in FIG. 5 and is identified by the reference indicator 22''. This technique is especially useful in situations where heavy leads should be used, such as, for example, in a surge suppression circuit used to protect against EMP or against HEMP. It is also useful in manufacturing large numbers of modules or clamping means for use in many different applications. A large ampacity rating for leads 72 is used so that the variety of applications is great.

As shown in FIG. 5, the line conductors 18 are split to define ends 74 connected to associated ends of the leads 72. As before, additional protection devices P can be used in conjunction with module 22'', and these additional protection devices P can be modified to include to include large leads 72 as well. Additionally, the above disclosed means of connecting the terminals to the line conductors 18 can be used in conjunction with the module 22''. Thus, for example, the leads 72 can be connected to a plate 54 on the module 22'' as indicated by the dotted lines in FIG. 5.

Figure 6:
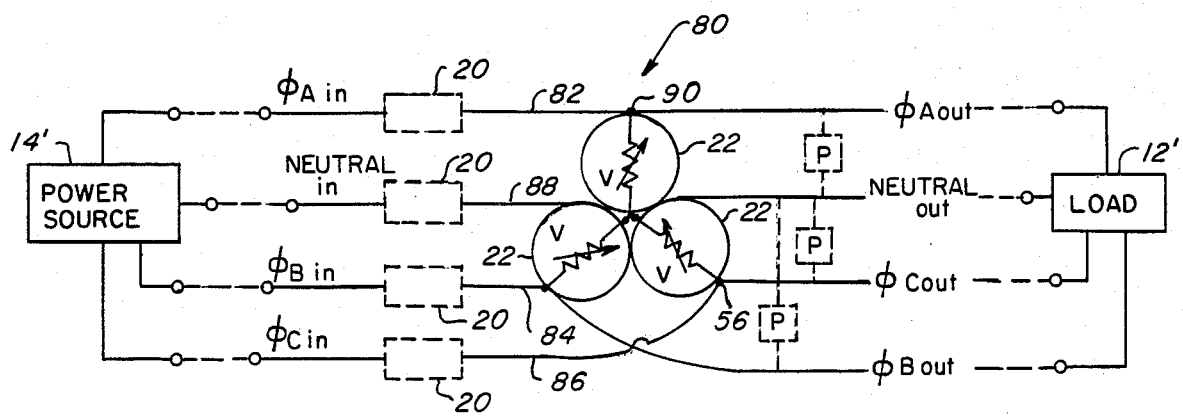
Figure 7:
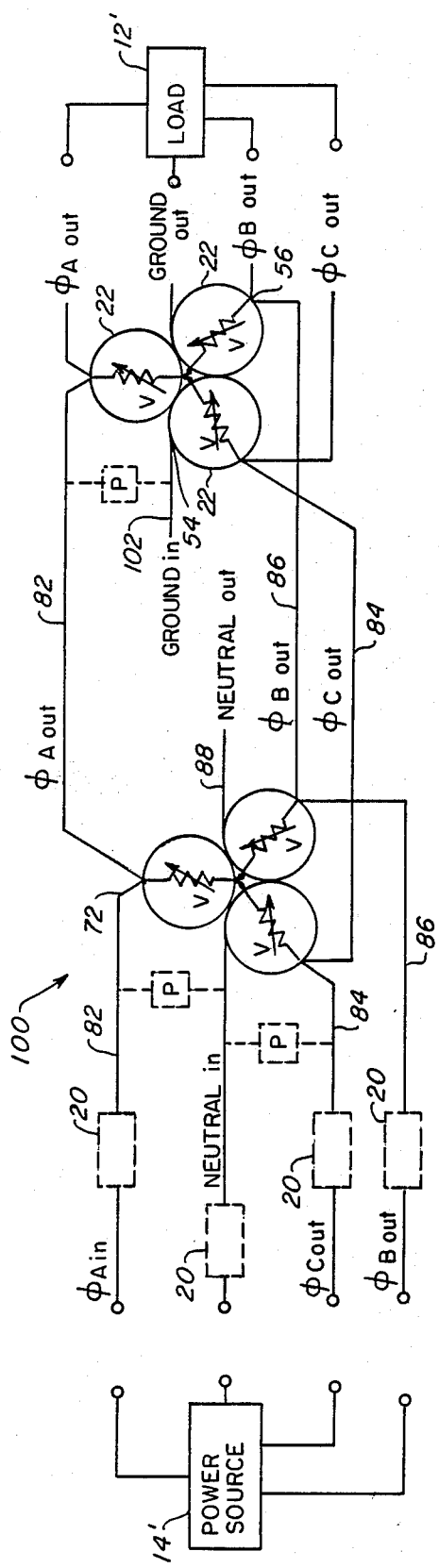

FIGS. 6 and 7 indicate surge protection circuits used in conjunction with multi-phase loads 12' and multi-phase power sources 14'. The principle in the multi-phase situation is the same as in the above-disclosed single-phase situation, to wit: the clamping element or clamping elements used in a multi-phase surge protection circuit have the terminals thereof connected directly to the lines associated with such clamping elements whereby a resistance-free path is established between such clamping elements and the line conductors so the let-through voltage associated with a surge is essentially equal to the clamping voltage of the clamping element itself. Such clamping voltage can be zero for a short circuit or any finite value suitable for a particular application.

Thus, in FIG. 6, a surge protection circuit 80 includes three line conductors 82, 84 and 86 and a neutral line conductor 88, each connected at one end thereof to the multi-phase power source 14', and at the other end thereof to the multi-phase load 12'. Three clamping elements 22 are included in the surge protection circuit 80 and each of these clamping elements includes a terminal, such as terminal 90, at each end thereof. One of the terminals of each clamping element is mounted directly on the lines 82, 84 and 86, respectively, and the other terminal of each clamping element is mounted directly on the neutral line conductor 88.

FIG. 7 shows a surge protection circuit 100 which is adapted to include a ground line conductor 102 as well as the neutral conductor 88 and the other line conductors 82, 84 and 86. Accordingly, the surge protection circuit 100 includes three additional clamping elements 22 each having one terminal connected directly to one of the line conductors 82, 84 and 86 and the other terminal connected directly to the ground line conductor 102.

Any of the above discussed means for connecting the clamping element terminals to the associated line conductor can be used, and this is indicated in the surge protection circuits 80 and 100. Furthermore, additional protection devices P can be used in conjunction with the clamping elements of these circuits, as is also indicated in FIGS. 6 and 7. Another configuration may comprise a combination of the embodiments shown in FIGS. 6 and 7, plus suppression elements between neutral and ground.

Figure 1:
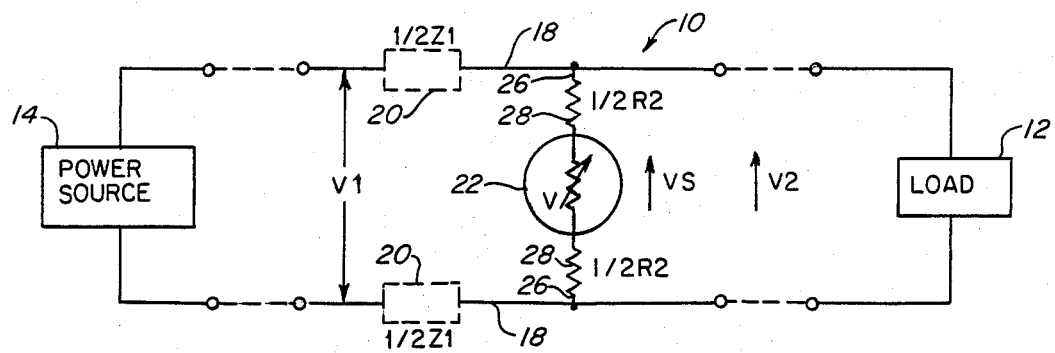
FIG. 1 is a schematic illustrating the prior art.
Figure 8:
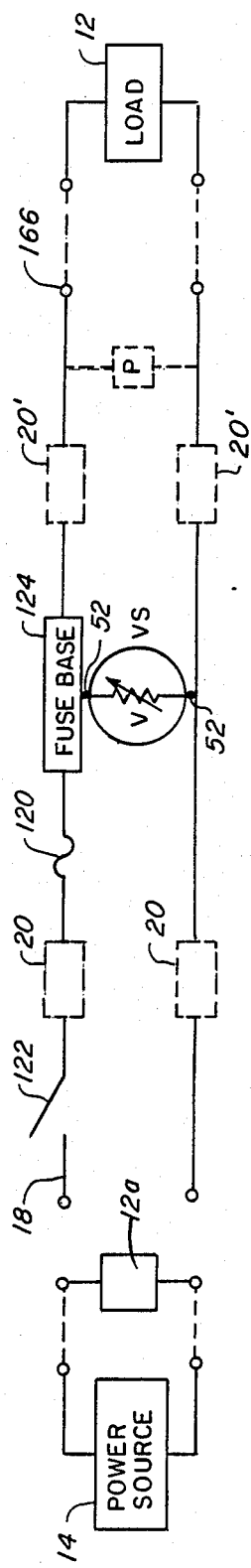

In many systems used for parallel protection of mains, a circuit breaker panel, or electrical distribution switch gear, or the like, the first element next to the sensitive load may be the input protective fuse and the corresponding fuse base providing connection between the sensitive load panel and the suppression elements. In the prior art, long leads are run from the output terminal of the fuse base to the clamping element and back again to either, typically, a ground or a neutral terminal. Accordingly, as shown in conjunction with FIG. 1, there is an additional impedance in the surge protection circuit which increases the let-through voltage. By adapting the teaching of the present disclosure to this situation, the let-through voltage can be significantly reduced. In most cases, the closest element to the load is the input fuse which is mounted on a fuse base. Performance may significantly be improved by mounting some or all of the clamping elements in the fuse base itself, thus eliminating the lead from each phase conductor to the clamping element. This is shown in FIG. 8 where line conductors 18 are each connected at one end to a single-phase power source 14 and include a fuse 120, an, optionally, a switch 122. The fuse 120 includes a fuse base 124 which is connected via a line conductor to the single-phase load 12. A clamping element 22 includes terminals 52 at each end thereof with one of the terminals 52 connected directly to the fuse base 124 and having the other terminal 52 connected directly to the other line conductor 18.

As indicated in dotted lines in FIG. 8, a load 12a can be paralleled with the power source 14. In such a case, moving part of the suppressors to the fuse removes the effect of impedance 20' with regard to load 12a. The power source can include a circuit breaker panel, and the circuit breaker panel can be protected at the input.

Some large current fuse bases use a buss bar construction and screws and nuts to hold the assembly together. These same elements may be used to connect the fuse base to one terminal of the clamping element. Often, a three-phase fuse block will have the three resultant fuses and busses arranged parallel to each other. The present technique can be used to minimize the let-through voltage in this situation as well. This is shown in FIG. 9 in which surge suppressor circuit 150 includes a clamping element 22 between a fuse base associated with each of three line conductors 152, 154 and 156 and a neutral line conductor 158.

To achieve a low resistance for a common neutral connection, a metal plate 160 shown in FIG. 10 can be constructed the size of the entire fuse base or slightly larger to accommodate a neutral terminal 162 on one side thereof. The metal plate 160 can be affixed to the bottom of the fuse base 124 and holes 164 are defined in the fuse base to accommodate one of the terminals 52 of the clamping elements 22 within the fuse base with a zero lead length. The large surface area of the metal plate 160 achieves an extremely low resistance between the physical location of the clamping element and the neutral terminal 162. If surge suppression is also desired from each phase to ground, the technique disclosed above in conjunction with FIG. 9 can be easily adapted. For example, assume that suppression is desired from both phase-to-neutral and phase-to-ground. The plate 160 can be cut into two pieces so there is an upper half and a lower half with respect to the fuse position. The clamping elements for phase-to-neutral are installed in the upper half and the bottom plate is used to connect to neutral, while similar set of clamping elements can be installed in the lower half (terminal end) of the fuse base and a terminal provided for connection to ground. Should suppression also be desired between neutral and ground, the two plates can be made with a spacing to permit additional clamping elements to be soldered between the two halves of the metal plate. Similar construction techniques using stacked plates and other similar geometries can also be used without departing from the scope of the present disclosure.

Output terminals, such as output terminals 166, may be added to the "last end" of any clamping element or device mounted on the load side of the fuses by use of the construction techniques described above. Then, all clamping elements will be equally effective for contributing to a lower let-through voltage. In this case, the output current is limited to the size of the fuse. In practical applications, this may be a sixty to two hundred twenty-five amp fuse, or similar range with similar physical characteristics.

As discussed above, since electrical disturbances have a wide variety of characteristics, no single element is fully capable of protecting against all possible electrical disturbances. This has given rise to the so-called hybrid protection circuit in which several individual clamping elements are connected together. In such hybrid protection circuits, the leads used to connect the individual clamping elements together form part of the aforediscussed R2, and this impedance is added to the impedance 28 in the leads 26. This effect increases the value of R2 and thus increases the let-through voltage.

Figure 11:
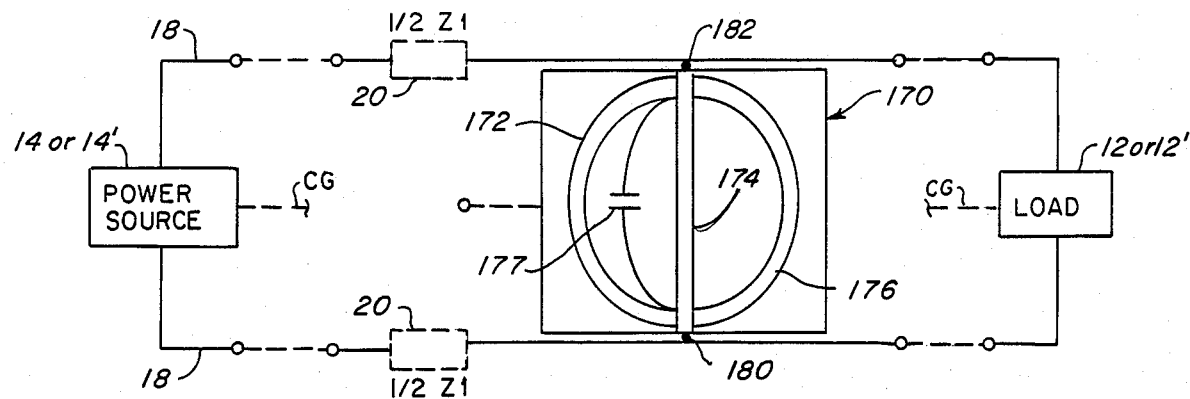
Figure 12:
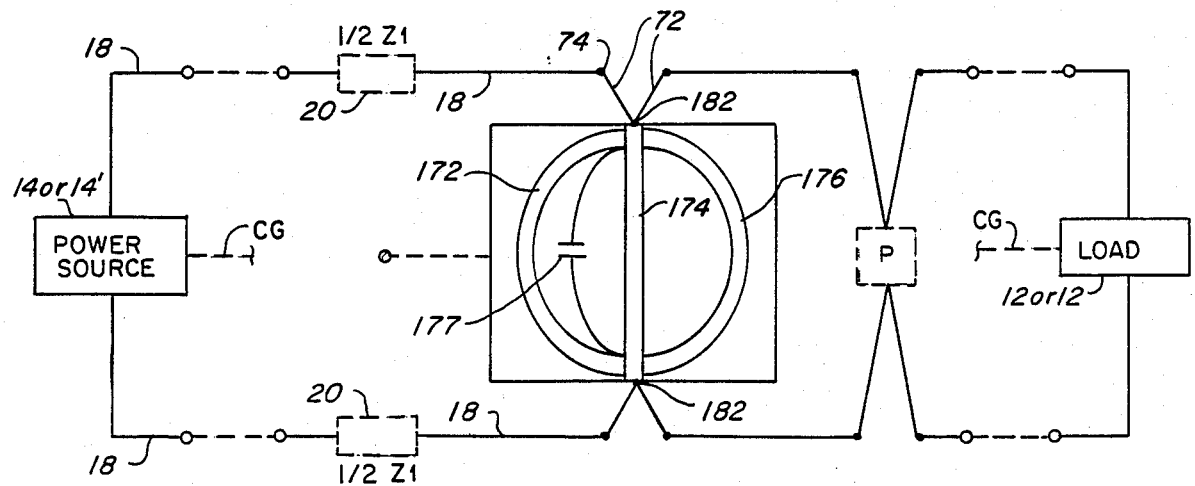

In order to apply the above principles to such a hybrid situation, some or all of the individual clamping elements are directly connected together at the terminals thereof to form a module. The module then includes terminals at each end thereof corresponding to the terminals 52, and these terminals are connected directly to the line conductors as above discussed. This modular concept is shown in FIGS. 11 and 12 for a single-phase application and for a multi-phase application respectively. These two figures also indicate the various means of connecting the modules to the line conductors as disclosed above, as well as further suppression devices also as discussed above.

As shown in FIGS. 11 and 12, each module 170 includes a plurality of separate clamping elements, such as MOV 172, SAS 174, gas tube 176, capacitors 177, and the like. Each of these separate clamping or filtering elements includes terminals, such as terminal 180, at each end thereof, and the terminals of the various separate clamping elements can be connected directly together to configure the separate clamping elements in the way desired by the designer. The "end" clamping elements each includes one terminal, such as terminal 182, which corresponds to terminals 52 of the clamping element 22 shown in the above figures. These "end" terminals are then connected directly to the line conductors 18. The modular concept discussed above in reference to FIGS. 11 and 12 can be used in conjunction with either the single-phase or the multi-phase configurations. Such applicability is shown in FIGS. 11 and 12 by the dotted lines CG indicating the neutral and/or the ground line conductors. Multiple tandem modules may also be used as physically applicable. It is also possible to parallel a number of MOV's together to produce a desired operation. Thus, for example, two, five, eight, or the like MOV's can be paralleled together to form a module having the desired effect.

The plate structure described in regard to FIG. 10 may also be used in construction of the FIG. 11 and 12 modules both as a means of supporting the suppressor elements and as a wide-area low impedance conductor.

Figure 13:
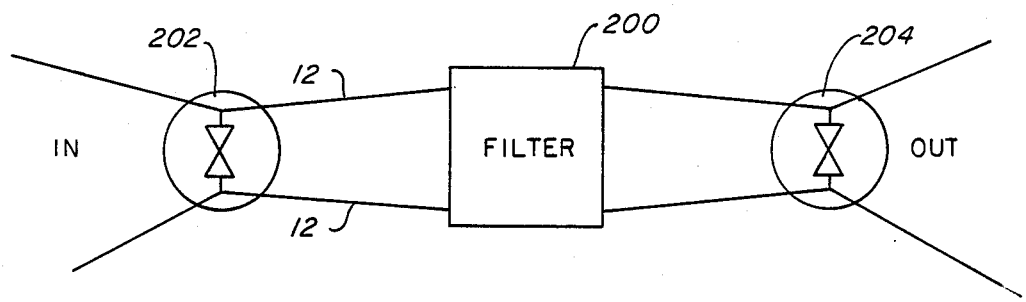
Figure 14:
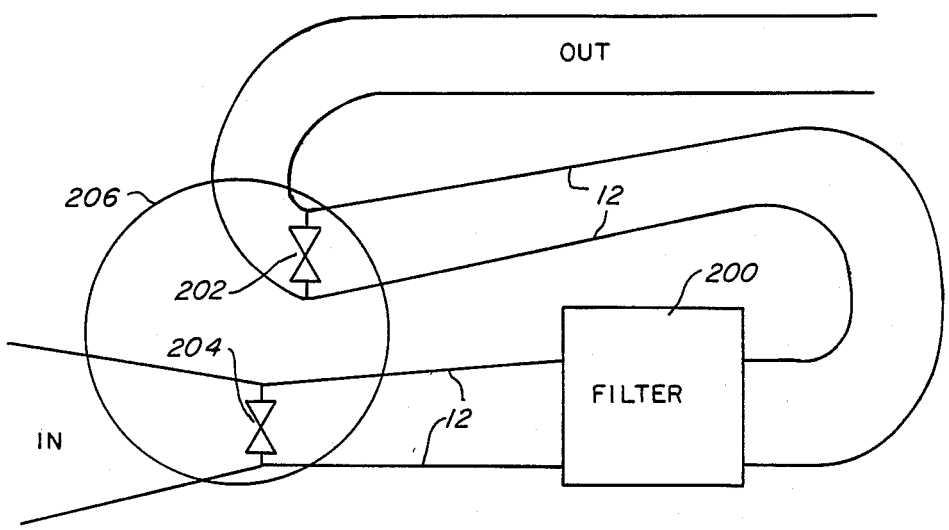

Still a further embodiment of the present invention is shown in FIGS. 13 and 14 in which a filter element 200 is also interposed between the power source 14 and the load 12. As fully discussed in U.S. Pat. No. 4,675,772 (the disclosure of which is fully incorporated herein by reference), power surges can often create a reactive spike build-up at the load side of the network. Accordingly, the filter element 200 is used to overcome this problem. The action of the filter element can be enhanced using the principles of the present invention. Thus, a clamping means 202 can be included on the source side of the filter, and a clamping means 204 can be included on the load side of the filter. According to the principles of the present invention, the clamping means are coupled to the line conductors 18 in a manner that, when activated by a power surge in the line conductors, the voltage across the line conductors is essentially equal to the clamping voltage so that $V2=Vs$ as above discussed. This is accomplished, as above discussed, by having the terminals of the clamping means mounted directly on the line conductors to establish an impedance-free path between such clamping means and the line conductors. Alternatively, the clamping means can include leads having an ampacity equal to or greater than the ampacity of the line conductors. The clamping means can, as above discussed, be a single element, or a plurality of elements which are the same or different.

The configuration shown in FIG. 14 is the same as that shown in FIG. 13 except that both of the clamping means are contained in a single module 206. It is noted that, even in the FIG. 14 embodiment, the terminals of each clamping means are still mounted directly on the line conductors to establish an impedance-free path between such clamping means and such line conductors. The above-mentioned high ampacity lead configuration can also be used in the FIG. 14 embodiment as well.

Figure 15:
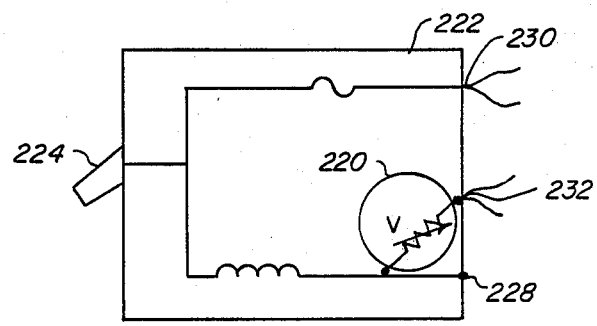

Yet another application of the present invention is shown in FIG. 15. A clamping means 220 is built directly into the same housing 222 as a circuit breaker 224. The leadless, or high ampacity form of the clamping means or the single or multiple element form of the clamping means can also be used. The terminals of the clamping means are integrated directly into the circuit breaker to protect the particular line conductors of interest. Thus, the housing can include a screw 228 to which a load line is connected and a clip 230 to which a feed, neutral or ground line is connected. The terminal of the clamping means is connected directly to the line conductor via a terminal connection 232 so that the suppressor means is connected across the two lines to be protected. This principle can be extended to multiphase situations by the inclusion of additional suppressors as necessary in the same housing.

While the present disclosure describes the protection circuit in combination with a generalized load, this protection circuit can be used in other contexts as well. For example, the circuit could be integrated into the body of a switch, a fuse, or circuit breaker to obtain a "zero length" connection. The other suppressor terminal can then be brought out of the equivalent of a pass through (single phase) or a "neutral" or "ground" plate installed for attachment to the other suppressors. The present techniques can also be used with telephone line pairs, telecommunication equipment and the like. Based on the teaching of the above disclosure, those skilled in the art will be able to visualize additional applications of the surge protection circuit of the present invention. Accordingly, no limitation is intended by any specific detailing of possible uses.

The above disclosure is intended to provide those skilled in the art enough teaching so that they can understand what is included in the present invention. However, no limitation is intended, and any embodiment, modification or the like that comes within the scope of the appended claims is intended to be encompassed within this invention.

I claim:

1. A surge protection circuit comprising
two line conductors each connected at one end thereof to a single-phase power source and at the other end thereof to an electrical load to be protected from the effects of a surge in power;
an active clamping element having a terminal at each end thereof, each of said clamping element terminals being mounted directly on a respective one of said line conductors in a zero-lead manner which defines an essentially impedance-free path directly between said line conductors and said clamping element.

2. A surge protection circuit comprising:
three line conductors and a neutral line conductor each connected at one end thereof to a three-phase power source and at the other end thereof to an electrical load to be protected; and
three active clamping elements each having a terminal at each end thereof, one terminal of each clamping element being mounted directly on a respective one of said line conductors in a zero-length lead manner and the other terminal thereof being mounted directly on said neutral line conductor in a zero-length lead manner whereby an essentially impedance-free path is formed between said line conductors and said active clamping elements.

3. The surge protection circuit defined in claim 2 further including a ground conductor connected at one end thereof to the electrical load and further clamping elements connected between each of said line conductors and said ground conductor, each of said further clamping elements including terminals at each end thereof and which are mounted directly on the respective lines.

4. The surge protection circuit defined in claim 1 wherein said line conductors are separated to define extra ends between the ends thereof which are connected to the power source and the to the load respectively, said line conductor extra ends being connected directly to said clamping element so that when said clamping element is activated there is essentially only a clamping voltage established between said line conductors.

5. The surge protection circuit defined in claim 1 wherein said clamping element terminals each include an electrically conductive plate.

6. The surge protection circuit defined in claim 4 wherein said clamping element terminals are each formed by an electrically conductive plate and said line conductor extra ends are fixed to said plates.

7. The surge protection circuit defined in claim 1 wherein each of said line conductors includes insulation and said insulation is stripped at a location between said line conductor ends to be affixed directly to one of said clamping element terminals.

8. The surge protection circuit defined in claim 1 wherein each of said clamping element terminals includes a gripping means for gripping an associated line conductor.

9. The surge protection circuit defined in claim 2 wherein each of said clamping element terminals includes a gripping means for gripping an associated line conductor.

10. The surge protection circuit defined in claim 2 further including a ground line connected at one end thereof to the electrical load, and three additional clamping elements each having a terminal at one end thereof with one terminal of each of said three additional clamping elements being mounted directly on a respective one of said line conductors and the other terminal of each of said three additional clamping elements being mounted directly on said ground line whereby essentially impedance-free paths are formed between said line conductors and said clamping elements and between said ground line and said three additional clamping elements.

11. The surge protection circuit defined in claim 1 further including protective devices having terminals at each end thereof which are connected directly to said line conductors.

12. The surge protection circuit defined in claim 4 further including protective devices having terminals at each end thereof which are connected directly to said line conductors.

13. The surge protection circuit defined in claim 2 further including protective devices having terminals at each end thereof which are connected directly to said line conductors.

14. The surge protection circuit defined in claim 10 further including protective devices having terminals at each end thereof which are connected directly to said line conductors.

15. A surge protection circuit comprising:
two line conductors one of which is connected at one end thereof to a single-phase power source and the other end thereof being connected to an electrical load, the other of said line conductors being connected at one end thereof to the single-phase power source, a fuse connected to the other end of said other line conductor and having a fuse base connected to the electrical load;
an active clamping element having a terminal at each end thereof, one of said terminals being mounted directly on said fuse base in a zero-length lead manner and the other of said clamping element terminals being mounted directly on said one line conductor in a zero-length lead manner whereby an essentially impedance-free path is formed between said active clamping element and said fuse base and between said active clamping element and said other line.

16. A surge protection circuit comprising:

three line conductors and a neutral conductor each connected at one end thereof to a three-phase power source, the other end of said neutral conductor being connected to an electrical load;

a fuse connected to each of said line conductors and having a base connected to the electrical load;

three active clamping elements each having a terminal at each end thereof, one of said clamping element terminals being mounted directly on a fuse base as a zero-length lead and the other terminal of each clamping element being mounted directly on said neutral conductor as a zero-length lead whereby an essentially impedance-free path is formed between each of said clamping elements and an associated fuse base and between each of said clamping elements and said neutral conductor.

17. The surge protection circuit defined in claim 1 wherein said clamping element protects said load from the high frequency energy contained in the leading edge of a power surge.

18. The surge protection circuit defined in claim 15 further including an output terminal associated with said one line conductor and another output terminal associated with the other line conductor and a clamping means connected between said output terminals.

19. A surge protection circuit comprising:

two line conductors each connected at one end thereof to a single-phase power source and at the other end thereof to an electrical load to be protected against surges in power;

active means connecting said line conductors together across said electrical load in a zero-length lead manner, said active means having a clamping voltage associated therewith and forming an electrical resistance when the voltage applied across said active means is less than a critical value and forming a very low impedance shunt path between said line conductors and across said electrical load when the voltage applied across said active means is equal to or greater than said critical value, said shunt path having a voltage associated therewith which is equal to said clamping voltage.

20. The surge protection circuit defined in claim 19 wherein said electrical resistance is high enough to be considered to be an open circuit.

21. A surge protection circuit comprising:

three line conductors and a neutral line conductor each connected at one end thereof to a three-phase power source and at the other end thereof to an electrical load to be protected against power surges;

active means connecting each of said three line conductors to said neutral line conductor in a zero-length lead manner, said active means having a clamping voltage associated therewith and forming an electrical resistance when the voltage applied thereacross is less than a critical value and forming a very low impedance shunt path when the voltage applied thereacross is equal to or greater than said critical value, said shunt path having a voltage associated therewith which is equal to said clamping voltage.

22. The surge protection circuit defined in claim 21 wherein said electrical resistance is high enough to be considered as being an open circuit.

23. A method of protecting an electrical load against voltage surges comprising:

providing line conductors which connect an electrical load to a power source;

connecting an active clamping means across the line conductors in a zero-length lead manner, the clamping means having a clamping voltage associated therewith;

establishing an impedance across the line conductors;

breaking down that impedance to a value which establishes the clamping voltage between the line conductors when the voltage applied between the line conductors equals or exceeds a critical value.

24. A method of protecting an electrical load against voltage surges comprising:

connecting the electrical load to a multi-phase power source using a plurality of line conductors and a neutral line conductor;

connecting a clamping means directly between each line conductor and the neutral line conductor in a zero-length lead manner, establishing an impedance across the line conductors;

breaking down the impedances to a value which establishes the clamping voltage between the line conductors when the voltage applied between the line conductors and the neutral line conductor is equal to or greater than a critical value.

25. The surge protection circuit defined in claim 1 wherein said clamping element includes an MOV.

26. The surge protection circuit defined in claim 2 wherein said clamping element includes an MOV.

27. The surge protection circuit defined in claim 1 wherein said clamping elements includes a plurality of separate surge protection devices, each of said separate surge protection devices having a surge protection device terminal on each end thereof, one of the surge protection device terminals of each of said separate surge protection devices being connected directly to a corresponding surge protection device terminal of another surge protection device whereby an essentially impedance-free path is formed between connected separate surge protection devices, two of said separate surge protection devices having terminals which form the clamping element end terminals which are connected directly to said line conductors.

28. A surge protection circuit comprising:

a plurality of line conductors each connected at one end thereof to a multi-phase power source, and at the other end thereof to an electric load to be protected;

a plurality of active clamping elements each having a terminal at each end thereof, one terminal of each clamping element being mounted directly on one of said line conductors in a zero-length lead manner and the other terminal of each of said clamping elements being mounted directly on another of said line conductors in a zero-length lead manner whereby an essentially impedance-free path is formed between said line conductors and said clamping elements.

29. The surge protection circuit defined in claim 2 wherein each of said clamping elements includes a plurality of separate surge protection devices, each of said separate surge protection devices having a surge protection device terminal on each end thereof, one of the surge protection device terminals of each of said separate surge protection devices being connected directly to a surge protection device terminal of another surge protection device whereby an essentially impedance-free path is formed between connected separate surge protection devices, two of said separate surge protection devices having terminals which form the clamping element end terminals which are connected directly to said line conductors.

30. The surge protection circuit defined in claim 28 wherein each of said clamping elements includes a plurality of separate surge protection devices, each of said separate surge protection devices having surge protection device terminals on each end thereof, one of the surge protection device terminals of each of said separate surge protection devices being connected directly to a surge protection device terminal of another surge protection device whereby an essentially impedance-free path is formed between connected separate surge protection devices, two of said separate surge protection devices having terminals which form the clamping element end terminals which are connected directly to said line conductors.

31. A surge protection circuit comprising:
three line conductors and a neutral line conductor each connected at one end thereof to a three-phase power source and at the other end thereof to an electrical load, said line conductors being divided to have connection ends;
three clamping elements each having a terminal at each end thereof and each being adapted to have a large impedance when voltage thereacross is less than a critical value and to break down to a clamping impedance having a clamping voltage associated therewith when the voltage thereacross is equal to or in excess of the critical value;
a pair of leads each connected at one end thereof to one clamping element terminal of each clamping element and connected at the other end thereof to one of said line conductor connection ends to connect each line conductor to one of said clamping elements via said leads;
said leads being identical in electrical characteristics to the line conductors so the ampacity associated with each lead is identical to the ampacity associated with each line conductor whereby the electrical impedance associated with the clamping element and the leads connected thereto is essentially equal to the electrical impedance associated with the clamping element itself being connected directly to the line conductors so that only the voltage associated with the clamping element itself will appear across the line conductors connected together via a clamping element when that clamping element breaks down.

32. A surge protection circuit comprising:
two line conductors each connected at one end thereof to a single-phase power source and at the other end thereof to an electrical load;
a clamping element having a terminal at each end thereof and which is adapted to have a large resistance thereacross when the voltage thereacross is less than a critical value and to break down to be a clamping impedance having a clamping voltage associated therewith when the voltage thereacross is equal to or greater than the critical value;
a pair of leads each connected at one end thereof to each clamping element terminal and each connected at the other end thereof to an associated one of said line conductors to connected said each line conductor to one of the clamping element terminals via said pair of leads, said leads being identical in electrical characteristics to the line conductors so the ampacity associated with each lead is identical to the ampacity associated with each line conductor whereby the electrical impedance associated with the clamping element and the leads connected thereto is essentially equal to the electrical impedance associated with the clamping element being connected directly to the line conductors so that only the clamping voltage associated with the clamping element itself will appear across the line conductors connected together via a clamping element when that clamping element breaks down.

33. The surge protection circuit defined in claim 32 wherein said clamping element includes an MOV.

34. The surge protection circuit defined in claim 25 further including a second MOV in parallel with the first-mentioned MOV.

35. The surge protection circuit defined in claim 34 further including a plurality of additional MOV's connected in parallel with the first-mentioned MOV and with the second-mentioned MOV.

36. The surge protection circuit defined in claim 26 further including a second MOV in parallel with the first-mentioned MOV.

37. The surge protection circuit defined in claim 36 further including a plurality of additional MOV's connected in parallel with the second MOV and in parallel with the first-mentioned MOV.

38. A surge protection circuit comprising:
a plurality of line conductors each connected at one end thereof to a power source and at the other end thereof to an electrical load to be protected from the effects of a surge in power;
a clamping means having a specified clamping voltage and terminals at each end thereof;
means connecting said clamping means terminals to said line conductors across said electrical load in a manner such that upon occurrence of a surge in power in said line conductors, the voltage across said electrical load is essentially equal to the voltage associated only with the clamping voltage of the clamping means and has essentially no effect associated with any connection means used to connect said clamping means terminals to the line conductors.

39. In a system wherein a-c power is supplied to a load from an a-c voltage source, the system including a protector network disposed between said voltage source and said load, said protector network comprising a first voltage suppressor at the source side of said network connected across the supply lines from said source, a second voltage suppressor at the load side of said network connected across the supply lines to said load, the minimum breakdown voltage of the first suppressor being that voltage, above which would damage the load, whereby the breakdown of the first voltage suppressor results in the voltage across the load being below that which would damage the load and protecting said load from power surges and voltage transients occurring at said source side, and filter means between said first and second voltage suppressors for filtering the power to said load, said second voltage suppressor being effective to protect the load from conditions occurring at the load side, the improvement in combination therewith comprising:

the voltage suppressors each having terminals at each end; and each of the voltage suppressor terminals being mounted directly on a respective one of the supply lines in a zero-length lead manner to form an essentially inductance-free path between the supply lines and the voltage suppressors.

40. In a protective circuit for installation in a network wherein a-c power is supplied to an a-c load from an a-c voltage source via supply lines, the protective circuit being disposed between said source and said load and effective to prevent damage to the load from transient conditions occurring at both the source and load sides of the network, with the protective network including a first voltage suppressor at the source side of the network, a second voltage suppressor at the load side of said network, filter means disposed between the first and second voltage suppressors for filtering the input power to said load, the voltage breakdown of the first voltage suppressor as distinguished from the voltage breakdown of the second voltage suppressor, being principally effective to protect the load from transient conditions occurring at the source side, while the voltage breakdown of the second voltage suppressor, as distinguished from the voltage breakdown of the first voltage suppressor, being principally effective to protect the load from transient conditions occurring at the load side, an improvement in combination therewith comprising:

the voltage suppressors each having terminals at each end thereof; and each of said voltage suppressor terminals being connected directly to associated ones of said supply lines in a zero-length lead manner to form an essentially inductance-free path between the supply lines and the voltage suppressor.

* * * * *